United States Patent [19]

Sheffer

[11] Patent Number: 5,055,851
[45] Date of Patent: * Oct. 8, 1991

[54] VEHICLE LOCATION SYSTEM

[75] Inventor: Eliezer A. Sheffer, Plainview, N.Y.

[73] Assignee: TrackMobile, Inc., San Diego, Calif.

[*] Notice: The portion of the term of this patent subsequent to Jan. 2, 2007 has been disclaimed.

[21] Appl. No.: 443,465

[22] Filed: Nov. 29, 1989

Related U.S. Application Data

[63] Continuation of Ser. No. 194,479, May 16, 1988, Pat. No. 4,891,650.

[51] Int. Cl.$^5$ .............................................. G01S 3/02
[52] U.S. Cl. ..................... 342/457; 380/58; 380/59; 455/53; 455/54; 340/539
[58] Field of Search ............... 342/457; 380/58, 59, 380/63; 455/53, 54; 340/539

[56] References Cited

U.S. PATENT DOCUMENTS

| | | | |
|---|---|---|---|
| 2,922,142 | 1/1960 | Lappin | 340/825.57 |
| 3,018,457 | 1/1962 | Kleist et al. | 340/825.34 |
| 3,058,106 | 10/1962 | Cutler | 342/353 |
| 3,137,854 | 6/1964 | Anderson | 342/463 |
| 3,419,865 | 12/1968 | Chisholm | 342/457 |
| 3,531,801 | 9/1970 | Huebscher | 342/457 |
| 3,694,579 | 9/1972 | McMurray | |
| 3,828,306 | 8/1974 | Angeloni | |
| 3,848,254 | 11/1974 | Dreginger et al. | 342/457 |
| 3,922,678 | 11/1975 | Frenkel | 342/457 |
| 3,947,807 | 3/1976 | Tyler | |
| 4,101,873 | 7/1978 | Anderson et al. | 340/539 |
| 4,139,889 | 2/1979 | Ingels | |
| 4,152,693 | 5/1979 | Ashworth, Jr. | |
| 4,177,466 | 12/1979 | Reagan | |
| 4,187,497 | 2/1980 | Howell et al. | 340/539 |
| 4,247,846 | 1/1981 | Zeidler | 340/523 |
| 4,369,426 | 1/1983 | Merkel | |
| 4,475,010 | 10/1984 | Huensch et al. | |
| 4,494,119 | 1/1985 | Wimbush | 342/457 |
| 4,577,182 | 3/1986 | Millsap et al. | |
| 4,596,988 | 6/1986 | Wanka | 342/457 |
| 4,651,157 | 3/1987 | Gray et al. | |
| 4,740,792 | 4/1988 | Sagey | |
| 4,891,650 | 1/1990 | Sheffer | 342/457 |

FOREIGN PATENT DOCUMENTS

| | | |
|---|---|---|
| 011444 | 5/1980 | European Pat. Off. |
| 242099 | 10/1987 | European Pat. Off. |
| 251475 | 1/1988 | European Pat. Off. |
| 2016770 | 9/1979 | United Kingdom |
| 2207787 | 2/1989 | United Kingdom |

Primary Examiner—Thomas H. Tarcza
Assistant Examiner—David Cain
Attorney, Agent, or Firm—Rosen, Dainow & Jacobs

[57] ABSTRACT

A system for determining a location of a selected vehicle from which an alarm signal is generated which includes a fixed array of cellular sites each site having a wireless signal detecting and generating units each of which is capable of receiving an input alarm signal having a signal strength which is a function of the distance between the position of the vehicle generating the alarm signal and the position of each of the wireless signal detecting units. Each unit also is capable of transmitting an output signal which is a function of the strength of the input alarm signal. The system also includes a main wireless signal detecting apparatus for receiving an output signal from each of the wireless signal detecting and generating units and a control monitoring unit which is coupled to the main woreless signal detecting apparatus, for receiving output signals there from, each of the output signals being a function of the strength of the received input alarm signal, for determining the approximate location of the selected vehicle from which the alarm signal is generated.

20 Claims, 6 Drawing Sheets

VEHICLE LOCATION SYSTEM

This is a continuation of application Ser. No. 194,479, filed May 16, 1988, now U.S. Pat. No. 4,891,650, issued 01/02/90.

BACKGROUND OF THE INVENTION

The invention relates to a practical system for locating a selected vehicle from which an alarm signal is generated. More particularly, this invention concerns a system for automatically locating an automobile which is broken into and automatically tracking its position if it is driven away and for expeditiously dispatching police cars to it or intercepting it respectively.

The statistics on passenger vehicle or car theft in the United States are mind boggling and exceed one million cars a year. Insurance rates are climbing at an alarming rate and there are few if any feasible solutions in sight. The current car protection equipment available to individual car owners include a range of features and capabilities.

Specifically, the current available equipment can be categorized as localized alarm system protection, car location systems and fleet management systems. The localized alarm protection systems activate a warning device such as a siren when the car is broken into. Generally speaking this type of system is effective only if the car owner or the police are in the vicinity. Other people tend not to get involved in this situation and in many cases car alarm sounds are not being acted on by the police. The pros are that they are inexpensive and in some cases the warning device deters theft. The cons are that if the owner is not around there is a high likelihood that no action will be taken to apprehend the intruder. Also if the owner is around and is able to get to the vehicle he may be risking personal injury or worse, by the intruder. Car location systems will identify the location of the car after the fact, that is sometime after the intrusion is detected and the car is driven away from its parking spot. A good example of such a system is disclosed by U.S. Pat. No. 4,177,466 to Reagan. While there is a relatively high likelihood that the car will be eventually located, this type of system suffers from some distinct practical shortcomings, some of which are technical and some of which are political. The pros are that there is a relatively high livelihood that the stolen car will be located and returned to the rightful owner. The cons are that the car owner must notify the police that his car is missing before the police can take any search action. The problem is that if the owner is not around it may take sometime before he becomes aware that the car is missing and by then the car may be extensively vandalized. Furthermore such a system does not prevent nor deter stealing. Also because the system such as disclosed by the Reagan patent is based on esoteric infrastructure requiring very specialized antenna sites and equipment, it is quite expensive. Furthermore the state police are very reluctant to finance such a system. As such the system is available only in Massachusetts and even there the inventor had to donate the required equipment to the police before they were willing to use it. Furthermore, the car location system as disclosed in the Reagan patent utilizes location stations having location indicators, the latter comprising proximity detectors and/or radio direction finders. These location stations may be placed at fixed locations or carried by driver-operated finder vehicles.

Another car location system of a different type, such as disclosed in U.S. Pat. No. 3,922,678 to Frenkel, utilizes a plurality of wireless signal detecting and relaying means which must be equidistantly spaced from one another in a fixed array, all of which respond to an alarm signal from a wireless signal generating means carried by a mobile source located within a zone in their detection region, and each of which respond and transmit at frequencies differing from one another. A plurality of receivers are also required at a central control station such as police headquarters. Each of these receivers are tuned to receive signals of different frequencies corresponding in frequency to the signals transmitted by the relaying means to thereby determine the zone within which said mobile source is located and track its movement. Each zone corresponds to a particular area of a map within which the relays are arrayed and each zone is identified by one of a plurality of lamps disposed on the map, each lamp of which is responsive to those wireless detecting means which detect a mobile source located within a zone in their detection region. This type of system is also impractical in that it requires the construction of a fixed array of specialized antenna sites each of which are equidistantly spaced from one another, an expensive proposition and impractical in most densely populated urban areas. Fleet management systems are geared toward specialized application in truck fleet management. It is somewhat outside the scope of this discussion in that it is geared toward very large truck fleet owners who keep tabs on their vehicles. An example of the type of system utilize for fleet management are those which include LORAN -C transmitters. The elements of automatic car location and "alarm" detection are available on these systems, but the link to a monitoring central alarm station is beyond the realm of financial feasibility to an individual who would use such a system to protect against theft of his own car. The bulkiness and expense of such equipment effectively rules it out as a viable alternative in the individual car alarm and location detection market.

SUMMARY OF THE INVENTION

It is, therefore, an object of this invention to provide an automatic vehicle location system which can utilize the presently existing nationwide cellular radio network including its antenna sites and equipment located there and its controlling mobile telecommunications switching office ("MTSO") with only minor modifications to its software.

Another object of the present invention is to provide an automatic vehicle location system which can utilize both the aforedescribed, existing nationwide cellular radio system and the presently existing monitoring central alarm station's facilities and infrastructive. Both cellular networks and monitoring central stations can currently be found everywhere.

A further object of the present invention is to provide an automatic vehicle location system which is truly practical and inexpensive and which is almost totally based on presently existing and relatively inexpensive hardware none of which must be specifically designed to implement the system.

A still further object of this invention is to provide an automatic detection capability by a central alarm station in case of a car intrusion and/or theft.

Still another object of the invention is to provide a central alarm station with the location of the said vehicle at its parked location and thereafter its location if the car is stolen and while it is driven away.

Another object of the invention is to provide a system which automatically determines a vehicle's location both when there is an intrusion and while it is being driven away, the later resulting in on-going vehicle tracking, and to immediately have the police notified as to these acts to thereby have them either dispatched to the scene of the intrusion and/or dispatched to pursue the stolen vehicle. Multiple police cars may be dispatched and guided by the central alarm station's dispatcher.

A further object of the invention is to provide a system which automatically determines a vehicle's location without the necessity of the owner or anyone at the scene notifying the police.

A still further object of the invention is to provide a system which automatically determines a vehicle's location when there is an intrusion and/or theft thereby protecting its owner against a possible confrontation with the intruder.

Still another object of the invention is to provide a system which determines tho car's location while the break-in is occurring and not sometime later thereby obviating any possible vandalization.

Another object of the invention is to automatically disable the car when a break-in occurs thereby requiring the intruder to initially spend additional time in trying to enable the car during which time the police are alerted to the break-in and are already dispatched to the site of the intrusion.

A further object of the invention is to offer to a car owner a choice of deterrents including a mode wherein the intruder will not be aware that the car is under continuous surveillance by virtue of its position being automatically made known through an operation in the central alarm station.

A still further object of another embodiment of the present invention is to provide an automatic vehicle parking location system which can utilize the presently existing nationwide cellular network without any modifications at the presently existing central alarm station's facilities and infrastructure with only very minor modifications to its software.

The foregoing and related objects are obtained in accordance with the invention which, in its broadest aspects, provides a system for determining a location of a selected vehicle from which an alarm signal is generated. The system comprises a fixed array of a plurality of individual wireless signal detecting means for receiving an input alarm signal having a strength which is a function of the distance between the position of the vehicle generating the alarm and the position of each of the wireless signal detecting means. Each of these wireless includes a wireless signal generating means for transmitting an output signal which is a function of the strength of the input alarm signal. The system further includes a main wireless signal detecting means for receiving an output signal from each of the wireless signal generating means and a control monitoring means coupled to the main wireless signal detecting means. This control monitoring means receives output signals from the main wireless signal detecting means, which output signals are a function of the received input alarm signal. The control monitoring means also functions to determine the approximate location of the selected vehicle.

BRIEF DESCRIPTION OF THE INVENTION

The invention is illustrated in the drawings in which like reference characters designate the same or similar parts throughout the figures of which.

DETAILED DESCRIPTION OF THE INVENTION

Figure 1:
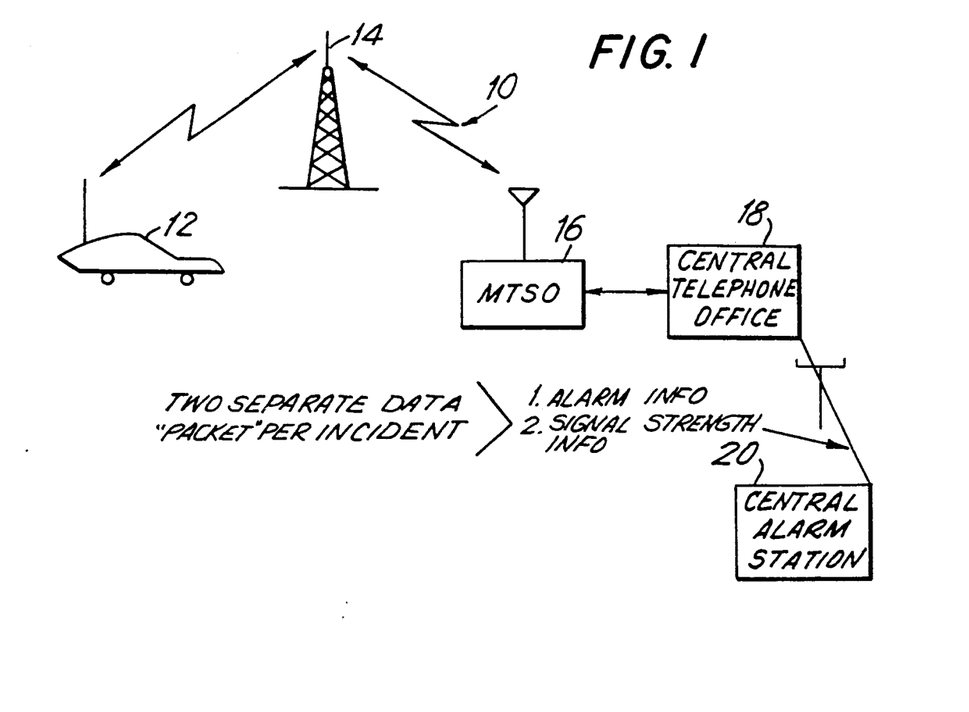
FIG. 1 is a simplified functional block diagram of the vehicle location system constructed in accordance with the principals of the invention.

Referring to FIG. 1, which is a simplified functional block diagram of the preferred embodiment of the invention, a system for determining the location of a selected vehicle from which an alarm signal is generated or vehicle location system, is generally indicated by reference numeral 10. This system 10 comprises a vehicle wireless generating means carried by a selected vehicle or mobile unit, generally indicated by reference numeral 12, a fixed array of cellular or cell sites (only one of which is shown therein), generally indicated by reference numeral 14, each of which includes a wireless signal detecting and generating means, a controlling mobile telecommunication switching office ("MTSO") or main wireless detecting means, generally indicated by reference numeral 16 coupled to a central telephone office, generally indicated by reference numeral 18, and a central alarm station or control monitoring means, generally indicated by reference numeral 20, coupled to the central telephone office 18.

In operation, when an unauthorized entry into the vehicle carrying the wireless generating means 12 is detected, an alarm signal is generated thereby which is transmitted over-the-air to a nearby fixed cellular or cell sites 14. The alarm signal contains information concerning the vehicle's identity and when this signal is received by the closest cell sites 14, each of their wireless signal detecting and generating means transmits a signal strength report message which is indicative of the signal strength of the received alarm signal from mobile unit 12, the signal strength of which is a function of and proportional to the distance between the position of the selected vehicle's wireless generating means 12 and the position of the receiving cell sites 14. These transmitted messages also include information concerning the identity of the selected vehicle 12 as well as the identities of the particular cell sites 14 transmitting said message signals. However only the cell 14 within which the mobile unit 12 is currently within transmits the alarm message itself; this cell 14 is also referred to as the current or active cell. These output alarm message signals are in turn transmitted to the MTSO 16 which transmits all this information over a landline telephone connection to a central telephone office 18, which also conveys it over a landline telephone connection to the central alarm station 20. The control alarm station 20 separately processes that portion of the alarm output signal message which includes the alarm message itself and the vehicle's identity as well as signals which include the signal strength report message transmitted from the closest cell sites 14, and the identities of each of these cell sites 14. Briefly then by utilizing a computer, located within the central alarm station 20, which processes the information contained by the alarm signal message, the approximate location of the selected vehicle 12 is determined by selecting a number of cell sites 14 which have the highest signal strength report messages and by the use of a special algorithm together with the use of a process of "arculation". This positional information is then coupled to a high resolution display monitor, also located at the central alarm station 20, which monitor superimposes it on its screen which already has displayed thereon a road map of the particular geographical area within which the selected vehicle 12 is located. The selected vehicle's positional information is constantly updated automatically thereby permitting a display monitor's operator to visually track the selected vehicle whether it stopped or is moving. A police patrol car having its own cellular radio can be dispatched by this operator if the selected vehicle is stolen. Communication between the police patrol car and the central station operator can be established through the patrol car's own cellular radio and its identification (I.D.) can be manually entered into the computer by the operator thereby displaying its location on the screen of the display monitor. The above-described central alarm station's 20 apparatus and processing are described in more detail hereinafter.

Figure 2:
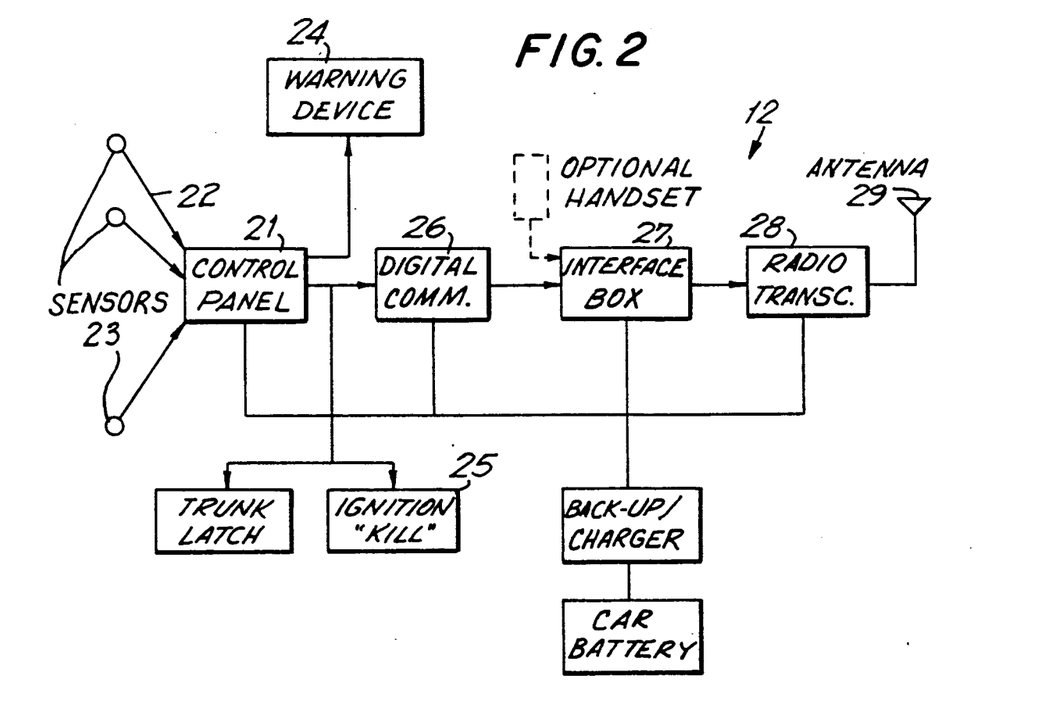
FIG. 2 is a functional block diagram of the vehicle's wireless generating apparatus of the vehicle location system of FIG. 1.

Referring now to FIG. 2, wherein is illustrated a functional block diagram of the vehicle's wireless generating means 12 of vehicle location system 10. This vehicle's wireless generating means 12 comprises an alarm control panel 21, which is of a conventional design, having means for connecting an alarm signal or plurality of input lines 22, connected to intrusion detectors or sensors 23, all of which are well-known in the art. An audible warning device 24, such as a siren, is connected to one output of the control panel 21. An ignition "kill" means 25 and/or an automobile's trunk latching mechanism can also be connected to the output of the control panel 21. The other output of the control panel is coupled to a digital communicator 26, which is of conventional design and its output is coupled to one input of an interface box 27; the other input thereof has an optional telephone handset 28 connected thereto. The interface box 27 is also of conventional design. The output of the interface box 27 is connected to the input of a cellular transceiver or radio 28 which has its output coupled to an antenna 29, both of which are well known in the art. When an intrusion is detected by any one of the sensors 23, the digital communicator 26 will be activated by an output signal present at the alarm control panel 21. When activated the digital communicator 26 and the warning device 24 will transmit an alarm signal to the cellular transceiver 28 through interface box 27. This alarm signal will include an alarm message, a pulse signal which identifies the subscriber or the vehicle's identity (i.e. customer/subscriber I.D.) preceded by a pulse signal representing the telephone number of the central alarm station 20. All the information is programmed within the digital communicator 26 at the time the vehicle wireless generating means 12 is installed as a unit in the selected vehicle or at the time those components which are missing from such wireless generating means 12 are installed. The interface box 27, when activated by the alarm signal from the digital communicator 26, will effectively and automatically dial the telephone number of the central alarm station 20 and permit transmission of the rest of the information contained in the alarm signal via its connected cellular transceiver 28 through its antenna 29, in an over-the-air transmission to nearby, adjacent, local cell sites 14 of a fixed array of local cell sites.

Figure 3:
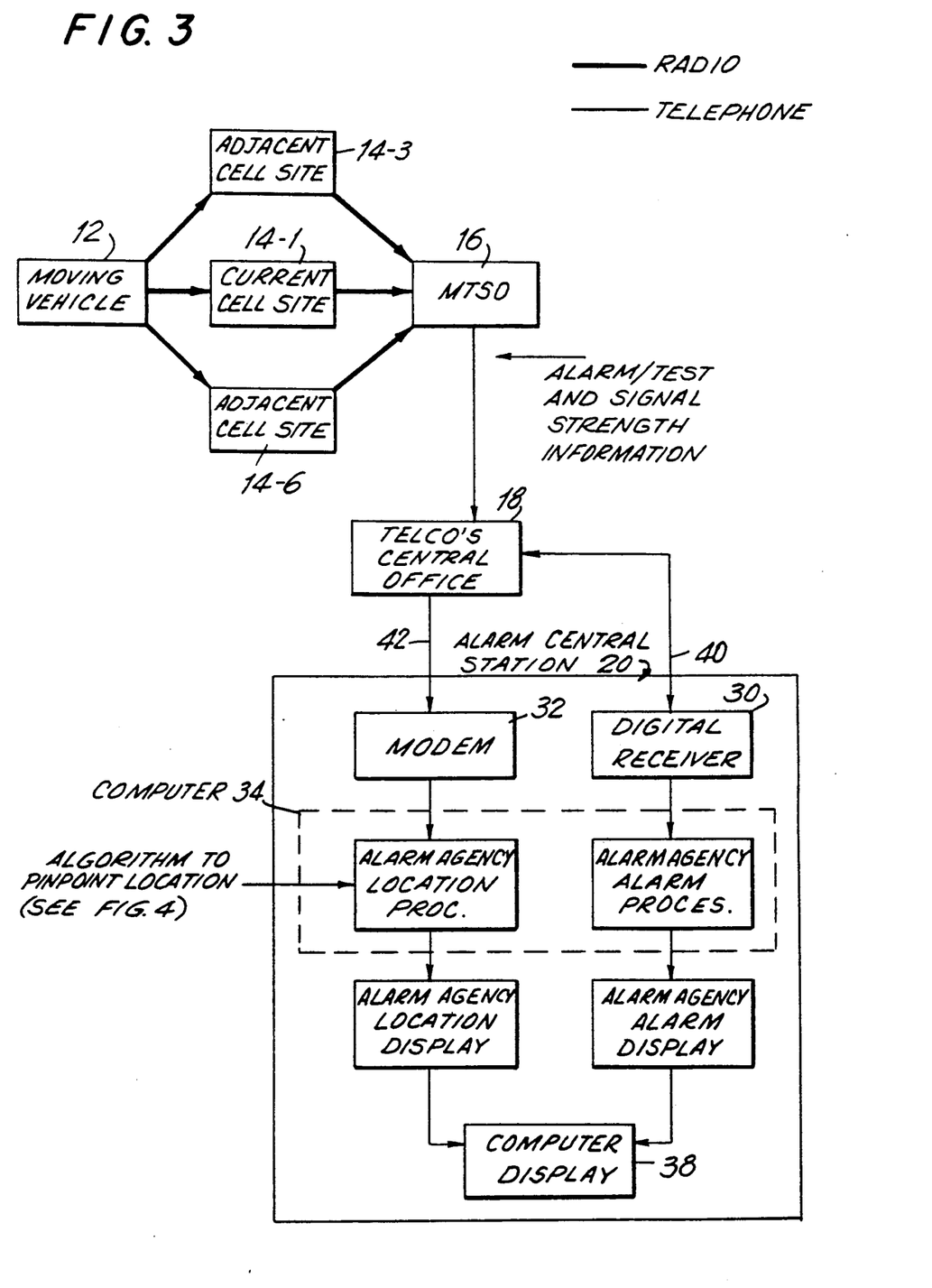
FIG. 3 is another simplified functional block diagram of the vehicle locational system of FIG. 1 with a portion of its fixed array of cell sites and its central alarm station shown in more detail.
Figure 4A:
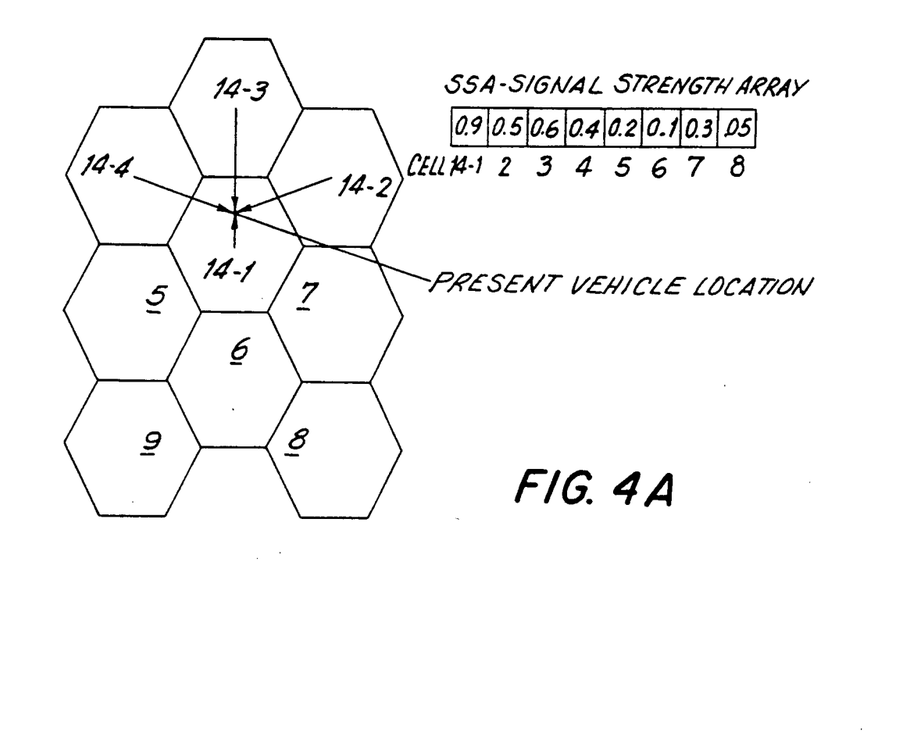
FIG. 4A shows the geographic layout of cell sites for use in the system of FIG. 1 and the four shortest "radii", shown with arrows, as determined by an algorithm used in the computer of said system of FIG. 1.
Figure 4B:
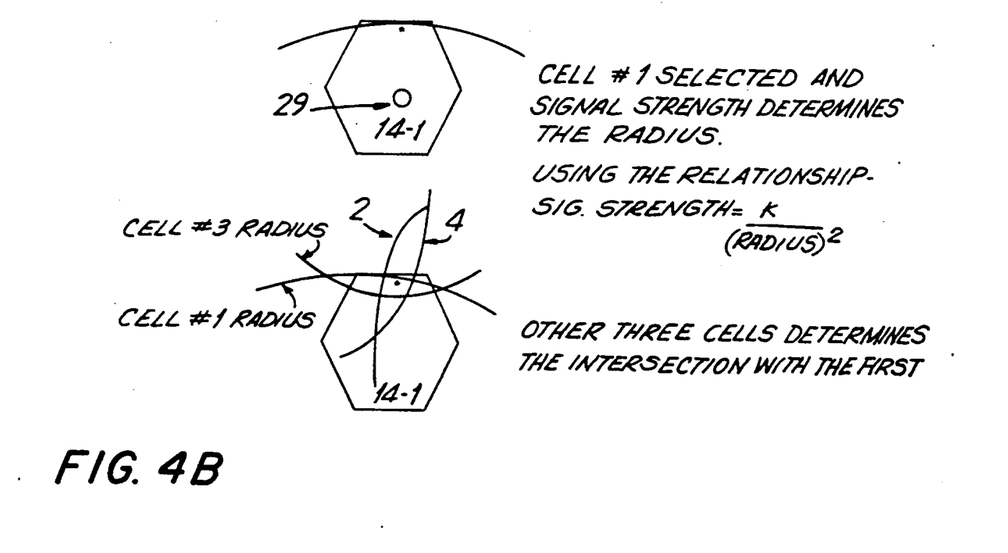
FIG. 4B shows the cell site within which the vehicle's wireless generating apparatus of FIG. 2 is located and graphically illustrates the process of "arculation" in accordance with said algorithm.

Referring now to FIGS. 1, 3 and 4, each cell site 14 contains the usual components (not shown) necessary for a conventional cell site, including a plurality of radio transmitters/receivers (transceivers) and directional antennas, each transceiver tuned to transmit to a mobile unit 12 at the frequency associated with a particular transmit radio channel and to receive from that mobile unit 12 over a corresponding receive radio channel. In addition, each cell 14 has one or more tunable receivers which are used to measure the signal strength of a received signal, including an alarm signal associated with any mobile receive channel, and generate a signal strength report message. Also included at each cell site is a cell site processor and a data link controller which sends messages over a data link line to the MTSO 16. The aforesaid equipment or components constituting the cell site 14 are all of conventional design and said equipment or components thereof are referred to as "individual wireless signal detecting means" and include "wireless signal generating means". Such conventional equipment constituting a cell site is shown in U.S. Pat. No. 4,475,010 to Huensch et al and such patent is hereby incorporated by reference herein. Referring now specifically to FIG. 3, the alarm signal transmitted by the mobile unit 12, which includes an alarm message, a pulse signal identifying the vehicle and a preprogrammed pulse signal identifying the central alarm station's 20 telephone number, is received by a plurality of nearby cell sites 14 including the current cell site 14-1 within which the mobile unit 12 is located and those cell sites 14 which are adjacent the current cell site 14-1, namely cell sites 14-3 and 14-6, as well as 14-2, 14-4 and 14-5, as shown in FIG. 4. Each of these cell sites 14-1 through 14-6, transmit a signal which contains (information concerning) the strength (of the) input alarm signals or a signal strength report message indicative of the signal strength of the received alarm signal from the mobile unit 12 and information concerning the identities of the particular cell sites 14 which provide said signal strength report messages except that only the current cell site's 14 output alarm signal message includes the alarm message itself. Such output alarm signal messages are transmitted to the MTSO 16 which is essentially of conventional design such as the MTSO 101 shown in FIG. 2 of the Huensch et al patent referred to previously. The MTSO shown therein is modified for use in this system in such a manner so it provides two different "packets" of information which are coupled to the central telephone office 18 after a connection is established with the central alarm station 20. Referring now specifically to FIG. 3, this connection is established after an unauthorized entry into the mobile unit 12 is detected and its cellular transceiver 28 is triggered to thereby initiate a telephone call to the central alarm station 20. The first packet contains information concerning the vehicle's identity and the alarm signal. The second packet contains signal strength information of the nearby cell sites 14 associated with the particular mobile unit 12 and which are being monitored by the MTSO 16, that is signal strength report messages, and the identities of each of their associated cell sites 14 together with information concerning the vehicle's identity. This second packet is sent to the central alarm station 20 through the central telephone office 18 using the same or a different preprogrammed telephone used in the transmission of the first packet.

Figure 5:
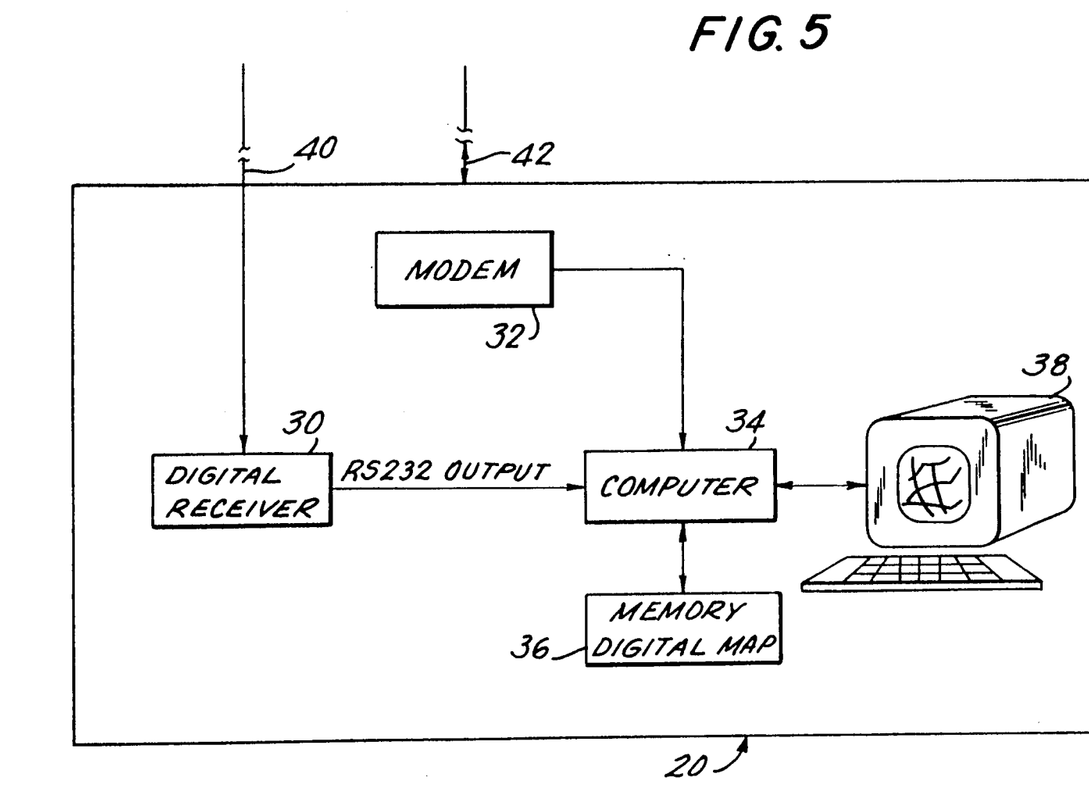
FIG. 5 is a functional block diagram of the central alarm station of the system of FIG. 1.
Figure 6:
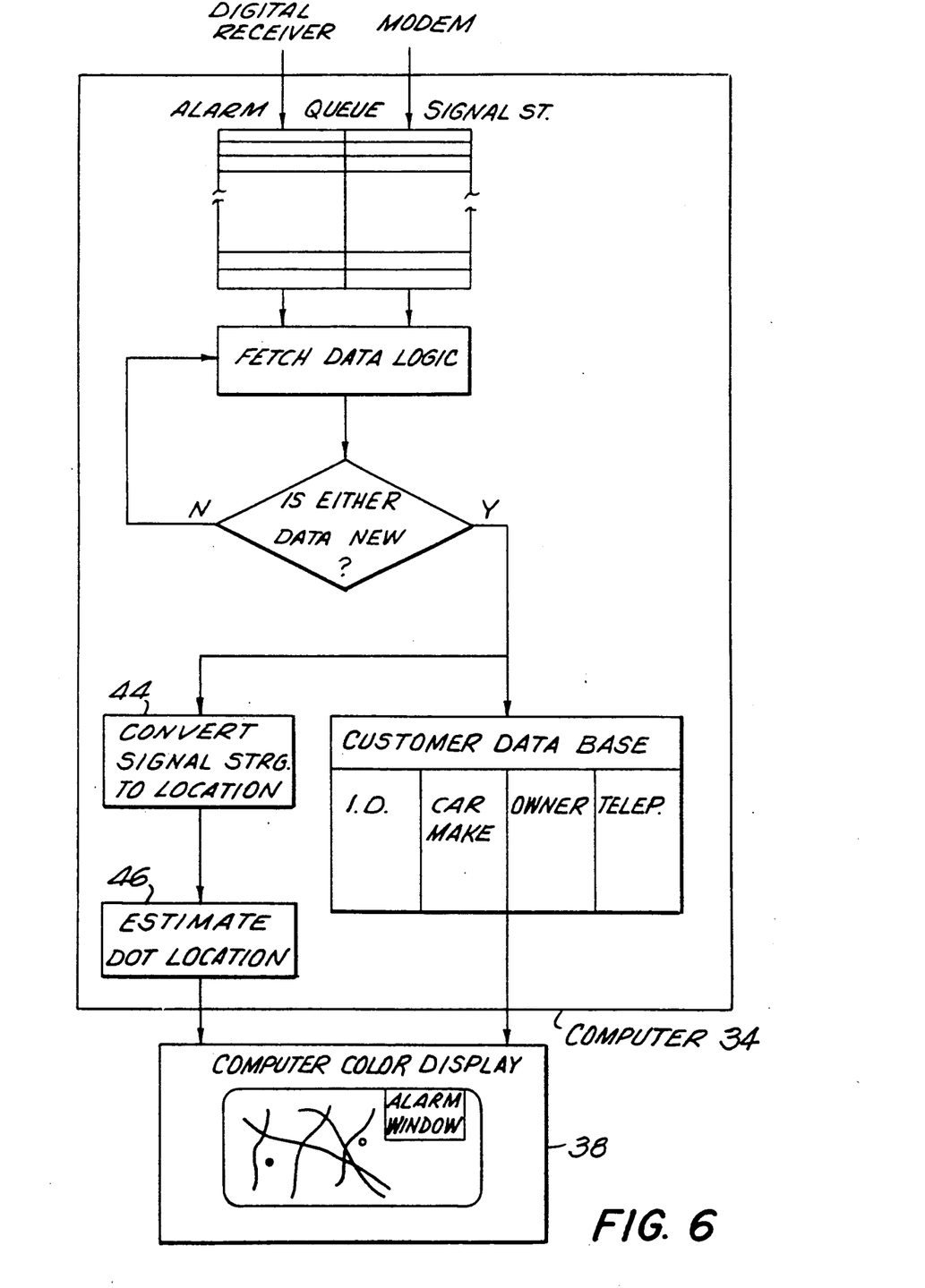
FIG. 6 shows a portion of the flow chart of the processor of the computer, and the computer monitor of the central alarm station of FIG. 5.

Referring now specifically to FIG. 5 and the lower portion of FIG. 3, the central alarm station's 20 components are all of conventional design except as noted hereinafter. The central alarm station 20 comprises a digital receiver 30, a modem 32, a computer 34, a digital map memory 36, and a high resolution display 38. The digital receiver 30, which is of conventional design, has its input coupled to a first telephone line 40 coming from the central telephone office 18, over which the first packet of information is transmitted. A standard digital receiver can be utilized in the system because the packet which it receives conforms to the standard format of alarm transmissions prevailing in the security industry. The modem 32 is also of conventional design, and has its input coupled to a second telephone line 42 also coming from the central telephone office 18, over which the second packet of information is transmitted. The computer 34 is also of conventional design, such as a PC/XT or AT computer, and which utilizes new software as depicted in FIG. 6. The output of the digital receiver 30 and the modem 32 are individually coupled to separate ports of the computer 34. The digital map memory 36, is well-known in the art, and similarly has its output coupled to a separate port of the computer 34. The high resolution display or computer monitor 38 is likewise conventional and its input is connected to an output port of the computer 34.

In operation when the first packet of information is received by the digital receiver 30, the information contained therein is verified as to its integrity by the built-in check capability of the digital receiver 30. This is necessary as this packet is susceptible to errors due to cellular network "dropping" of data and/or weather conditions. The digital receiver 30 will not acknowledge receipt of the packet unless the same data or information is received in two consecutive transmissions. When the computer 34 receives both packets of information, each packet is separately stored therein in a different memory buffer queue, and then they are matched since their record number in their respective memory buffers are the same. If the first and second packet properly match, then such packets are further processed in accordance with the flow diagram depicted in FIG. 6 eventually resulting in a display on the screen of the computer monitor 38.

The processing of such information to determine the approximate location of the selected mobile vehicle 12 is shown in said flow diagram of FIG. 6 by the steps labeled "convert signal strength to location" steps 44, and then step "Estimate dot location", step 46. The process involved in determining the approximate location and the algorithm utilized is described in detail subsequently.

The computer monitor 38 will display an unblinking dot, preferably red, on its screen representative of the selected mobile vehicle and its position thereon is indicative of the approximate location of the selected mobile vehicle, and which red dot is superimposed upon a road map of the particular geographical area within which the selected vehicle is located, which road map is accessed out of the digital map memory 38 by the computer 34 and then displayed on the screen of the computer monitor 38. The computer monitor 38 has the capabilities of zooming and panning into any region within the displayed road map. Furthermore the display on the screen of the computer monitor 38 includes a "window"-like area, where pertinent "dispatch" information concerning the selected vehicle 12 is displayed; this dispatch information would normally include a description of the vehicle, the name and telephone number of its owner, etc. This information would be derived from the alarm signal which, as indicated previously would include the vehicle's identity, which would be utilized to access the dispatch information from the customer data base stored within computer 34. A police car having its own cellular radio would then be dispatched by the display monitor's 38 operator if the selected vehicle 12 is stolen and the owner thereof is a subscriber to the service provided by the central alarm stations 20. When such police patrol car is dispatched, the central alarm station 20 operator or dispatcher will request the patrol car to "turn on" its own cellular car radio and identify themselves by providing the operator with the telephone number of the cellular radio in the patrol car. It should be noted that patrol cars will be equipped with cellular telephones identical to the cellular radios utilized in the protected selected vehicle's wireless generating means 12. The operator then manually enters the police car's I.D., its cellular radio's telephone number, into the computer 34, and the system 10 automatically locates and tracks the position of the dispatched police car in the same manner as it automatically locates and tracks the stolen vehicle 12. To enhance the interdiction process each dispatched police car is assigned its own color code by the dispatcher, other than red which color is only utilized to indicate a stolen vehicle, to identify it when the colored dot representing it is displayed on the screen of the monitor 38 and the computer 34 is adapted to display all dispatched police cars thereon with a blinking dot which represents them on the monitor's screen. The police officers in the dispatched police vehicle and the dispatcher in the central alarm station 20 commence a dialog via the cellular telephone's voice link, since the same cellular telephone utilized to automatically locate the dispatched police vehicle can provide voice communication between the officers and the dispatcher. The officers are then directed by the dispatcher to the approximate location of the stolen vehicle 12. The dispatcher then observes on the display screen the movement of the various blinking color dots representing the police cars toward the stolen vehicle 12, represented by the red dot. If the unblinking red dot is stationary, the other blinking dot(s) will start converging toward the approximate location of the stolen car 12. The dispatcher will continuously apprise the police officers as to their relative position to the said stolen vehicle 12, by giving directions verbally. This process continues until the least one of the blinking dots, representing the police cars, overlaps the red one, thereby indicating that at least one police car is practically "on top" of the said stolen vehicle 12. If the said stolen vehicle 12 moves, the red dot will also move on the screen of the display 38 and the same dialog will take place between the central alarm dispatcher and the police. However, since the said stolen vehicle 12 is a moving target, the dispatcher will now coordinate the chase among all patrol cars in the vicinity. The operator will "calibrate" his reading by comparing known police car location with their approximate dot location on the display screen. If the deviation from the location indicated by the displayed dot to the actual police car's location is say two blocks to the west, the central alarm station's operator/dispatcher will apply the same calibrating factor to the indicated position of the stolen car shown on the display screen (i.e. if the stolen car 12 represented by the red dot appears on the display screen at the corner of Fifth Avenue and 42nd Street, the operator will instruct the chasing patrol car to a target that is 2 blocks west from the indicated position of the red dot on the display screen). As the police car approaches the target, calibration will continue so as to pinpoint the exact location of the stolen car 12. All of this "calibration" process can be automated by the computer 34 if desired. It should be noted that this system 10 presently allows for only one chased stolen vehicle 12 at a time (but the operator can switch from one stolen vehicle session to another, but only one chase can be conducted at a time on the screen) although any number of manually entered police cars can be simultaneously displayed and automatically tracked thereby and because each police car would utilize a different color that can easily be visually identified and tracked by the operator. However, this limitation is only due to the limited capabilities of a human operator and not because of any technical limitations inherent in the system 10.

Although the system 10 itself can only provide an approximate location of a selected vehicle 12, this approximation limitation is essentially overcome by the previously described procedure between the dispatcher/operator and the dispatched police cars. In fact, because of this system 10 and the aforedescribed procedure used therewith, the effective ability of both in pinpointing a stolen vehicle can't be better. Furthermore, none of the other technologies used in practical vehicle location application's can approach its overall effectiveness.

Referring now specifically to FIGS. 4 and 6, steps 44 and 46 perform the necessary calculations to convert the signal strength report message which are indicative of the signal strength of the received alarm signal at the adjacent cell sites 14-1 through 14-8, to the approximate location of the selected mobile vehicle 12, the process of which is referred to as "arculation". This process involves the utilization of the following algorithm;

$$I = \frac{k}{r^2}$$

wherein I is equal to the strength of the received input alarm signal or signal strength report message at a particular cell site 14, wherein r is equal to a distance ("calculated radius") between the antenna of said particular cell site 14 and the selected vehicle 12, and wherein k is a constant. Furthermore the center of the cell from which the calculated radius is drawn is not necessarily the same as the geometric center of the cell; in this process it is the location of the cell's antenna 29. It should be noted that this "calculated radius" is not necessarily equal to the actual geometric radius of the cell. More particularly the information is processed as follows;

a) select the four strongest signal strength measurements, b) convert each signal strength measurement (I) into a distance (r), c) draw a circle for each of the cells selected in b) using for each cell a radius with a length equal to the distance r, as determined in a) and b), and using as a center for said circle the location of the antenna in the cell site, (an antenna 29 is shown off center in cell site 14-1 in the upper part of FIG. 4B).

d) the intersections of these four circles will approximate a "rectangle" of four arcs (this rectangle is shown in the lower part of FIG. 4B), and e) the center of this rectangle is the approximate location of the selected vehicle 12 (this center is the intersection of two straight lines drawn through the opposite apices thereof). Steps a) and b) are performed by step 44 and steps c), d) and e) are performed by step 46 (see FIG. 6).

Referring again specifically to FIG. 4A, the upper right hand corner, it depicts the signal strength array (SSA) or "neighbors list" for cells 14-1 through 14-8. On the left side of said figure a vehicle is shown located in cell 14-1 and with location being constantly monitored by the adjacent cells 14-2 through 14-8, by detecting the strength of their received alarm signals. This signal strength information will be measured approximately every five seconds, but transmitted only when an alarm event occurs. Therefore, the cellular system will not be clogged with an inordinate amount of data transmissions. This signal strength information is continuously sent, when an alarm condition exists, and to that extent the signal strength measurements are updated constantly, and will reflect the location of the vehicle, regardless of whether it is stationary or moving.

Figure 7:
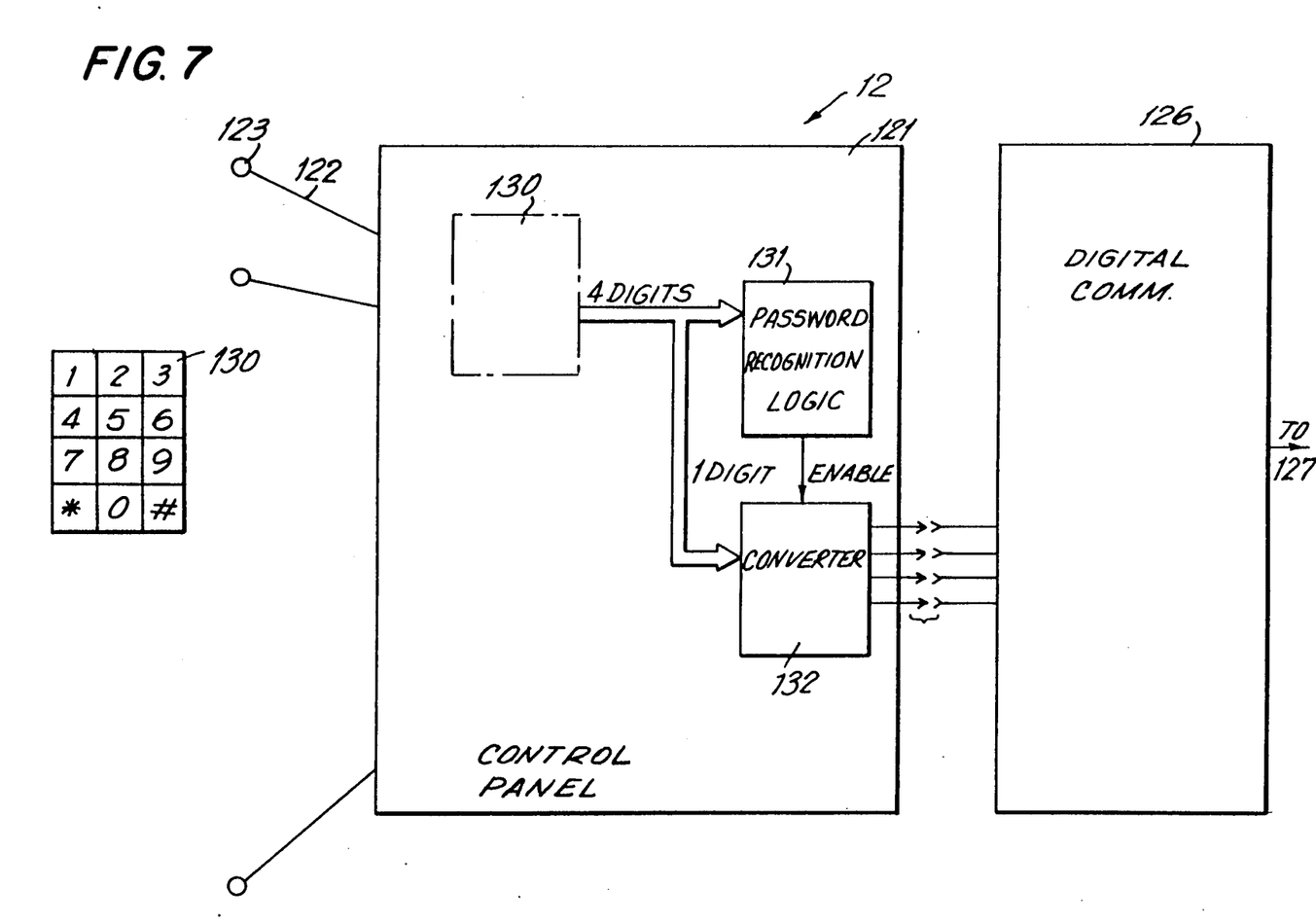
FIG. 7 is a functional block diagram of a portion of the vehicle's wireless generating apparatus of another embodiment of the vehicle location system of FIG. 1.

Referring now to FIG. 7, another embodiment of the system for indicating the location of a selected vehicle from which an alarm signal is generated is illustrated in part. This system is similar to the aforedescribed system illustrated in FIGS. 1-6 in that it utilizes essentially all the same major components and functions in the same manner to detect an unauthorized intrusion into the selected vehicle and to notify the central alarm station 20 of the intrusion and automatically provide the station with its location. However it lacks the capability of automatically tracking the vehicle. As a result the system is less complex in that the MTSO 16 requires absolutely no changes from its conventional design and the central alarm station 20 requires almost no changes from its conventional design and therefore does not require the additional equipment and software modifications as required in the first embodiment of this invention.

This system's concept is based on the principle that vehicle owners will generally enable or arm their vehicle alarm system's by entering an arming code consisting of a conventional password code. In this embodiment the enabling or arming code is a two-part code, the password code and a location code. Therefore in one operation two objectives are attained; the vehicle's alarm detection portion of the system will be activated and the location of the vehicle will be stored in its control panel for subsequent transmission to the central alarm station 20 upon detection of an unauthorized intrusion.

Still referring to FIG. 7, the vehicle's wireless generating means 12 remains the same as in the first embodiment except that its control panel 121 and its arming module or enabling means 130 are modified to accommodate the additional data associated with the addition of the location code to the password code and in this embodiment, only a single extra digit is used to identify location although of course two or more digits could be utilized when more than ten locations need to be identified. In the first instance an arming module or keypad 130 must be provided which is capable of accepting five rather than four digits; the modifications necessary to a conventional four digit arming module 130 are deemed obvious and therefore are not shown. Since a conventional digital communicator 126 as used in this system can transmit an alarm in a format where up to sixteen conventional combinations can be identified, the present embodiment uses such capability so that up to sixteen locations can be identified and transmitted to the central station. Accordingly, the control panel 121 is modified so that the location identifier, the fifth digit of the arming code, is isolated and converted to up to ten combinations of "zone" information and is coupled to an input of the digital communicator 126 as though it is the conventional zone information. Therefore the conventional control panel 121 is modified so as to function as a "converter" of part of the arming code, the fifth digit which represents location data, by translating it into the same conventional format as that used for the zone information portion of alarm data. This is accomplished in the modified control panel 121 by coupling only the first four digits, the password code, generated by the arming module 130 (shown in doted lines when it is disposed right on or in the control panel and directly connected thereto, and in solid lines when it is outside the vehicle and transmitting over-the-air) to a password recognition logic module 131, of conventional design, and coupling the fifth digit representing location data to a converter 132, which conventionally encodes the decimal digit into binary, before it is coupled to the digital communicator 126. A conventional central alarm station 20 requires only a minor modification to its software. In place of zone information, used to identify particular areas of a protected premise, in a subscriber's database, location information of a vehicle will be entered instead. The vehicle's owner will initially assign a single decimal digit code unique to each location he parks at, which will be entered in his database at the time he subscribes to the central alarm station's service, as well as the names of people or agencies to be dispatched in the case of a vehicle break-in, on a location by location basis.

In operation, when a vehicle owner parks at a particular location, he will arm the system by using his own password code and the proper location code (i.e. home is code 1, office is code 2, etc). In the situation where the vehicle is parked at a location other than that contained in the preprogrammed subscriber's database, the owner can use his vehicle's cellular telephone to notify the central alarm station's 20 operator as to his whereabouts. If there is an intrusion detected the operator's role will remain essentially the same as exists in present conventional systems. That is to telephone a person indicated in the subscriber's database for the particular location and/or dispatch the police or other security agency. Furthermore, in this embodiment it is preferable that the ignition kill unit 25 be energized whenever a break-in occurs to ensure that the vehicle is not moved from its parked location.

It should be understood that this invention is not limited to the specific details of construction and arrangement herein illustrated and/or described, and that changes and modifications may occur to one skilled in the art without departing from the spirit and scope of the invention.

We claim:

1. A system for determining a location of a selected vehicle from which an alarm signal is generated:
   a fixed array of a plurality of individual wireless signal detecting means, each of said individual wireless signal detecting means for receiving an input alarm signal having a strength which is a function of the distance between the position of the selected vehicle generating said alarm signal and the position of each of said individual one of said plurality of wireless signal detecting means;
   each of said individual wireless signal detecting means of said array including a wireless signal generating means for transmitting an output signal which is a function of the strength of said input alarm signal;
   a main wireless signal detecting means for receiving an output signal from each of said individual wireless signal generating means; and
   a control monitoring means, coupled to said main wireless signal detecting means, for receiving output signal there from, each of said output signals which is a function of the strength of said received input alarm signal, for determining the approximate location of said selected vehicle from which an alarm signal is generated.

2. The system in accordance with claim 1, wherein the approximate location of said selected vehicle is determined by arculation.

3. The system in accordance with claim 1, wherein said individual wireless signal detecting and generating means are disposed at a local cell site.

4. The system in accordance with claim 1, wherein said main wireless signal detecting means comprises a controlling mobile telecommunications switching office.

5. The system in accordance with claim 3, wherein said individual wireless signal detecting and generating means includes a signal strength measuring apparatus for measuring the strength of a received input alarm signal.

6. The system in accordance with claim 4, wherein said control monitoring means selects from said received output signals a plurality of those received output signals which contain the highest strength input alarm signals, and determines from the selected received output signals the approximate location of said selected vehicle.

7. The system in accordance with claim 3, wherein each of said wireless signal detecting means is located at a cell site and wherein said output signals from said wireless signal generating means includes information concerning the identity of their associated cell sites.

8. The system in accordance with claim 7, wherein said control monitoring means selects from said received output signals a plurality of those received output signals which contain the highest strength input alarm signals and together with positioned information concerning their associated cell sites determines the approximate location of said selected vehicle.

9. The system in accordance with claim 8, wherein said control monitoring means further utilizes dimensional information concerning their associated cell sites in determining the approximate location of said selected vehicle.

10. The system in accordance with claim 9, wherein said control monitoring means selects from said received output signals those signals with the four highest strength input alarm signals.

11. The system in accordance with claim 1, wherein the approximate location of said selected vehicle is determined by utilizing the following algorithm;

$$I = \frac{k}{r^2}$$

wherein I is equal to the strength of the received input alarm signal, wherein r is equal to a distance or calculated radius between said selected vehicle and the cell site antenna associated with the received input alarm signal's wireless detecting means, and wherein k is a constant.

12. The system in accordance with claim 1, including at least one vehicle wireless generating means, carried by said selected vehicle, for transmitting an alarm signal of sufficient strength to activate a plurality of adjacent ones of said individual wireless signal detecting means simultaneously.

13. The system in accordance with claim 1, wherein at least four adjacent ones of said individual wireless signal detecting means are simultaneously activated.

14. The system in accordance with claim 12, wherein said vehicle wireless generating means includes;
a digital communicator having an input and an output,
means for connecting an alarm signal line to said input of said digital communicator;
a cellular transceiver having an input and an output, said input coupled to said digital communicator,
an antenna connected to the output of said cellular transceiver, whereby an alarm signal received by said digital communicator will operate said cellular transceiver to generate an alarm signal, which will be transmitted over-the-air, of sufficient strength to activate said plurality of adjacent ones of said wireless signal detecting means.

15. The system in accordance with claim 13, wherein said at least four adjacent ones of said individual wireless signal detecting means includes;
an individual wireless signal detecting means at a current cell site within which said selected vehicle is located, and
at least three individual wireless signal detecting means located at cell sites which are adjacent said current cell site.

16. A system for indicating the location of a selected vehicle from which an alarm signal is generated:
a fixed array of a plurality of individual wireless signal detecting means, each of said individual wireless signal detecting means for receiving an input alarm signal;
each of said individual wireless signal detecting means of said fixed array including a wireless signal generating means for transmitting an output signal which is a function of said input alarm signal;
a main wireless signal detecting means for receiving an output signal from each of said individual wireless signal generating means; and
a control monitoring means; coupled to said main wireless signal detecting means, for receiving an output signal therefrom, said output signal which is representative of the location of said selected vehicle from which an alarm signal is generated.

17. The system in accordance with claim 16, wherein said vehicle wireless generating means includes;
a digital communicator having an input and an output,
control panel means having a first alarm signal input,
means for connecting said first alarm signal line to said first alarm signal input of said control panel means,
enabling means, for arming and disarming said system, including location signaling means, said location means for providing information representing the location of said selected vehicle when said enabling means is armed,
a cellular transceiver having an input and an output, said input coupled to the output of said digital communicator, and
an antenna connected to the output of said cellular transceiver, whereby an alarm signal received by said digital communicator will operate said cellular transceiver to generate an alarm signal, which will be transmitted over-the-air, of sufficient strength to activate said individual wireless signal detecting means.

18. The system in accordance with claim 17, wherein said enabling means includes a keypad means for entering a password code and a location code which enables or disables said system and provides information concerning the vehicles location, respectively.

19. The system in accordance with claim 18, wherein said control panel means includes data converting means for converting location code data into the same format as conventional alarm data with zone information.

20. A system for determining a location of at least one selected vehicle from which a location signal such as an alarm or chase signal is generated:
a fixed array of a plurality of individual wireless signal detecting means, each of said individual wireless signal detecting means for receiving an input location signal having a strength which is a function of the distance between the position of the selected vehicle generating said location signal and the position of each of said individual one of said plurality of wireless signal detecting means;
each of said individual wireless signal detecting means of said array including a wireless signal generating means for transmitting an output signal which is a function of the strength of said input location signal;
a main wireless signal detecting means for receiving an output signal from each of said individual wireless signal generating means; and
a control monitoring means, coupled to said main wireless signal detecting means, for receiving output signal therefrom, each of said output signals which is a function of the strength of said received input location signal, for calculating the approximate location of said selected vehicle from which a location signal is generated and for continuously recalculating the approximate location of said selected vehicle as its location changes.

* * * * *